(12) United States Patent
Zhou

(10) Patent No.: US 8,485,710 B2
(45) Date of Patent: Jul. 16, 2013

(54) BACKLIGHT MODULE AND LIGHT-BAR FIXING STRUCTURE THEREOF

(75) Inventor: Gege Zhou, Guandong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 12/997,892

(22) PCT Filed: Sep. 10, 2010

(86) PCT No.: PCT/CN2010/076817
§ 371 (c)(1),
(2), (4) Date: Dec. 14, 2010

(87) PCT Pub. No.: WO2012/006809
PCT Pub. Date: Jan. 19, 2012

(65) Prior Publication Data
US 2012/0275191 A1 Nov. 1, 2012

(30) Foreign Application Priority Data
Jul. 14, 2010 (CN) .......................... 2010 1 0230813

(51) Int. Cl.
*F21V 7/04* (2006.01)
(52) U.S. Cl.
USPC ............ 362/612; 362/613; 362/633; 362/634
(58) Field of Classification Search
USPC .................. 362/611, 612, 613, 396, 633, 634
See application file for complete search history.

(56) References Cited

U.S. PATENT DOCUMENTS

| 2007/0165421 A1* | 7/2007 | Sakai et al. .................. 362/612 |
| 2007/0165425 A1* | 7/2007 | Sakamoto et al. ............ 362/633 |
| 2007/0171676 A1* | 7/2007 | Chang .......................... 362/613 |
| 2008/0180972 A1* | 7/2008 | Sakamoto et al. ............ 362/613 |
| 2009/0237957 A1 | 9/2009 | Tsubaki |
| 2010/0073959 A1* | 3/2010 | Hamada ....................... 362/611 |
| 2010/0149835 A1* | 6/2010 | Cho et al. ..................... 362/612 |

FOREIGN PATENT DOCUMENTS

| CN | 101369069 A | 2/2009 |
| CN | 101556008 A | 10/2009 |
| CN | 101737678 A | 6/2010 |
| JP | 2005078832 A | 3/2005 |
| JP | 2005078873 A | 3/2005 |
| TW | 201007277 | 2/2010 |

* cited by examiner

*Primary Examiner* — Laura Tso
(74) *Attorney, Agent, or Firm* — Harness, Dickey & Pierce, PLC

(57) ABSTRACT

The present invention provides a backlight module and a light-bar fixing structure thereof. The light-bar fixing structure of the backlight module is mounted on a sidewall of a rack of the backlight module. The light-bar fixing structure has a plurality of clamping arms that are arranged side by side as a row of teeth and is capable of stably clamping and positioning a light bar of the backlight module. Thus, the light bar can be fixed on the rack without fastening through screws or thermally conductive adhesive tapes, so that mounting and dismounting are both convenient and fast. And dismounting process of the light bar does not need to dismount other components of the backlight module, such that other components of the backlight module can be prevented from being polluted during the dismounting process.

9 Claims, 4 Drawing Sheets

ABACKLIGHT MODULE AND LIGHT-BAR
FIXING STRUCTURE THEREOF

FIELD OF THE INVENTION

The present invention relates to a backlight module and a light-bar fixing structure thereof, and more particularly to a backlight module and a light-bar fixing structure thereof that mounting and dismounting of light bars are more convenient and fast.

BACKGROUND OF THE INVENTION

A liquid crystal displays is a flat panel display device using liquid crystal to display images, and has advantages of thin, low drive power and low power consumption, and is widely used in display device industry. However, a liquid crystal display panel is not self-luminous and needs an independent backlight source. And, using light emitting diodes (LED) as a backlight source has advantages of energy saving, longer working life and smaller volume as comparing to cold cathode fluorescent lamps (CCFL). Hence using light emitting diodes to replace cold cathode fluorescent lamps as a backlight source has become the current development trend of liquid crystal displays.

Please refer to FIG. 1 which discloses a cross-sectional side view of a conventional backlight module applying LED. A backlight module 90 has a frame 91, a light guide plate 92, a plurality of optical films 93, housing 94 and two light bars 95. The frame 91 has perpendicular portions 911 formed on two side edges thereof. The light guide plate 92 is mounted on a center of the frame 91. The optical films 93 are mounted on a top of the light guide plate 92. The housing 94 covers an outer edge of the frame 91 and fixes the optical films 93 and the light guide plate 92 from top to bottom. The light bars 95 are mounted on inner sidewalls of the perpendicular portions 911, respectively, wherein each light bar 95 has several LED devices 951 having an emitting direction toward the light guide plate 92. The light bars 95 are usually fixed on the perpendicular portions 911 by fastening through screws or thermally conductive adhesive tapes.

However, when assembling the backlight module 90, screws or thermally conductive adhesive tapes need to be applied on the perpendicular portions 911, the use of screws or thermally conductive adhesive tapes will make the assembling work more complicated, and the light bars 95 might be damaged when screw fastening is too tight, or product consistency or other assembly problems might be affected due to position misalignment of the thermally conductive adhesive tapes. Meanwhile, carrying out the fastening or sticking work in limited space is difficult. Moreover, a problem also occurs that precise material preparation and management are difficult due to too many types of components. Besides, when the backlight module 90 is working, temperature around the light bars 95 rises obviously, and some LED devices 951 may be damaged due to overheating, and then changing the light bars 95 will be necessary. When changing the light bars 95, the light guide plate 92 and the optical films 93 generally need to be dismantled at first, wherein such process might pollute the light guide plate 92 and the optical films 93.

Hence, it is necessary to provide a backlight module and a light-bar fixing structure thereof to overcome the problems existing in the conventional technology.

SUMMARY OF THE INVENTION

A primary object of the invention is to provide a light-bar fixing structure of a backlight module which has a plurality of clamping arms that are arranged side by side as a row of teeth and is capable of stably clamping and positioning a light bar of the backlight module. The light bar mounted through this way is easy to dismount, and the dismounting process does not need to dismantle other components of the backlight module in advance. Thus, other components of the backlight module can be prevented from being polluted during the dismounting process.

A secondary object of the present invention is to provide a backlight module which uses a light-bar fixing structure having a plurality of clamping arms to clamp and fix a light bar, so that the light bar can be mounted in the backlight module without fastening through screws or thermally conductive adhesive tapes, and dismounting or remounting thereof is more convenient.

To achieve the above object, the present invention provides a light-bar fixing structure of a backlight module which is mounted on a sidewall of a rack of the backlight module and has a plurality of clamping arms, which are arranged side by side as a row of teeth, to stably clamp a light bar of the backlight module.

To further achieve the above object, the present invention provides a backlight module which comprises:

a rack;

at least one light bar mounted on a sidewall of the rack; and at least one light-bar fixing structure mounted on the sidewall of the rack, wherein the light-bar fixing structure has a plurality of clamping arms arranged side by side as a row of teeth to clamp and fix the light bar.

In one embodiment of the present invention, each of the clamping arms is L-shaped and has a shorter portion and a longer portion, wherein an end of the shorter portion is vertically mounted on the sidewall, and the longer portion is protruded longitudinally from the other end of the shorter portion.

In one embodiment of the present invention, the longer portion is parallel to the sidewall.

In one embodiment of the present invention, the light bar has a circuit board and a plurality of light emitting devices, wherein the circuit board has a longer edge abutted against the shorter portions of the clamping arms, and the circuit board is clamped by the sidewall and the longer portions of the clamping arms; the light emitting devices are arranged at intervals and mounted on the circuit board, wherein each of the light emitting devices is disposed between two of the adjacent clamping arms.

In one embodiment of the present invention, the rack is a light bar bracket or a back board of a backlight module.

In one embodiment of the present invention, the rack has at least one perpendicular portion; the sidewall is an inner surface of the at least one perpendicular portion.

In one embodiment of the present invention, the rack further has a horizontal portion, and the at least one perpendicular portion is extended upward from at least one side edge of the horizontal portion.

In one embodiment of the present invention, the backlight module further has a light guide plate, wherein a side edge of the light guide plate is abutted against the longer portions of the clamping arms.

Comparing with the existing techniques, the backlight module and the light-bar fixing structure thereof use a plurality of clamping arms arranged side by side like a row of teeth as a means of fixing a light bar, such that not only steps of mounting the light bar on the backlight module can be simplified, but also other components of the backlight can be prevented from being polluted when the light bar need to be dismounted and changed.

DETAILED DESCRIPTION OF THE PREFERRED EMBODIMENTS

The foregoing objects, features and advantages adopted by the present invention can be best understood by referring to the following detailed description of the preferred embodiments and the accompanying drawings. Furthermore, the directional terms described in the present invention, such as upper, lower, front, rear, left, right, inner, outer, side and etc., are only directions referring to the accompanying drawings, so that the used directional terms are used to describe and understand the present invention, but the present invention is not limited thereto.

Figure 1:
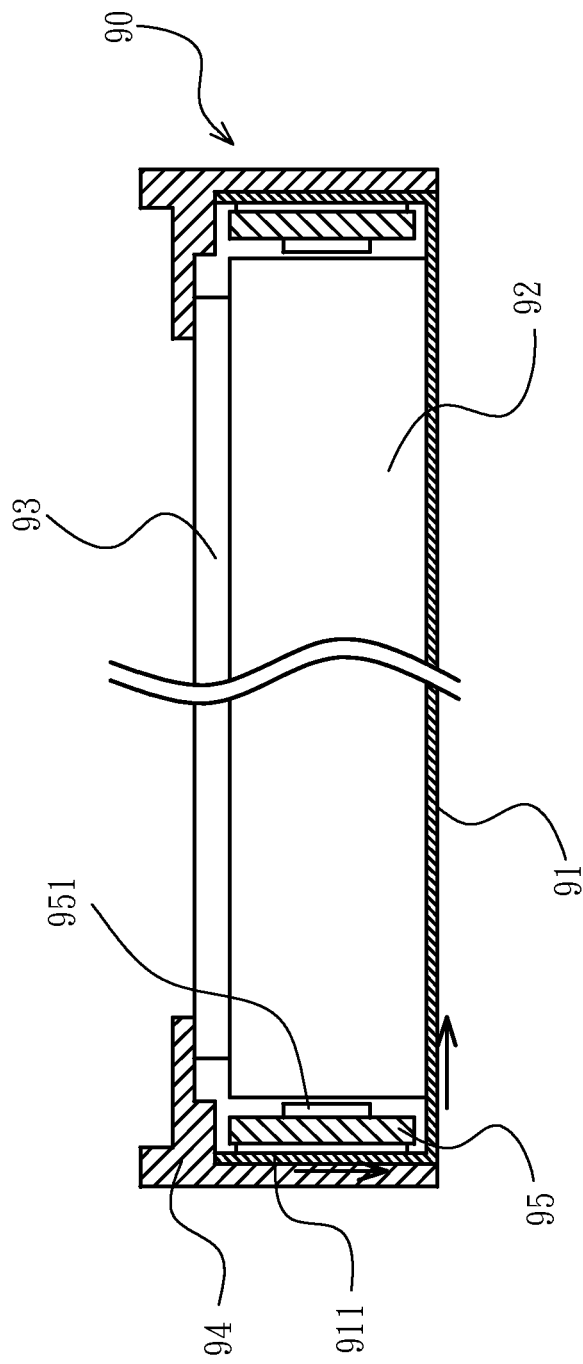
FIG. 1 is a cross-sectional side view of a conventional backlight module.
Figure 2:
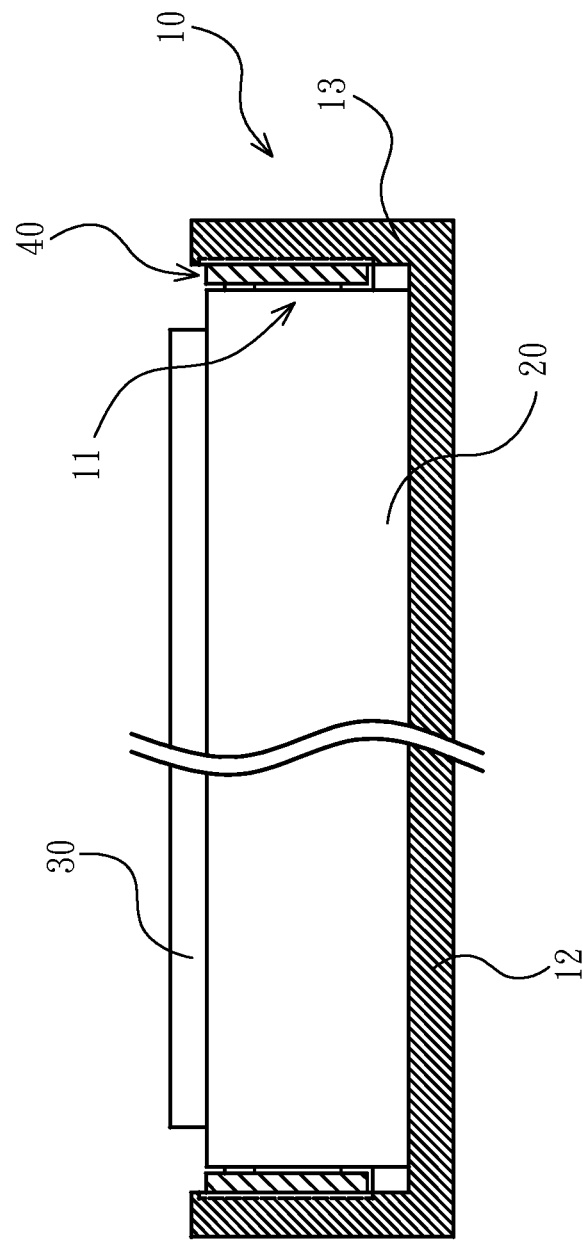
FIG. 2 is a cross-sectional side view of a backlight module and a light-bar fixing structure thereof according to a first embodiment of the present invention.

With reference to FIG. 2, FIG. 2 discloses a cross-sectional side view of a backlight module according to a first embodiment of the present invention. A backlight module comprises a rack 10, at least one light-bar fixing structure 11, a light guide 20, an optical film 30 and at least one light bar 40.

Figure 3:
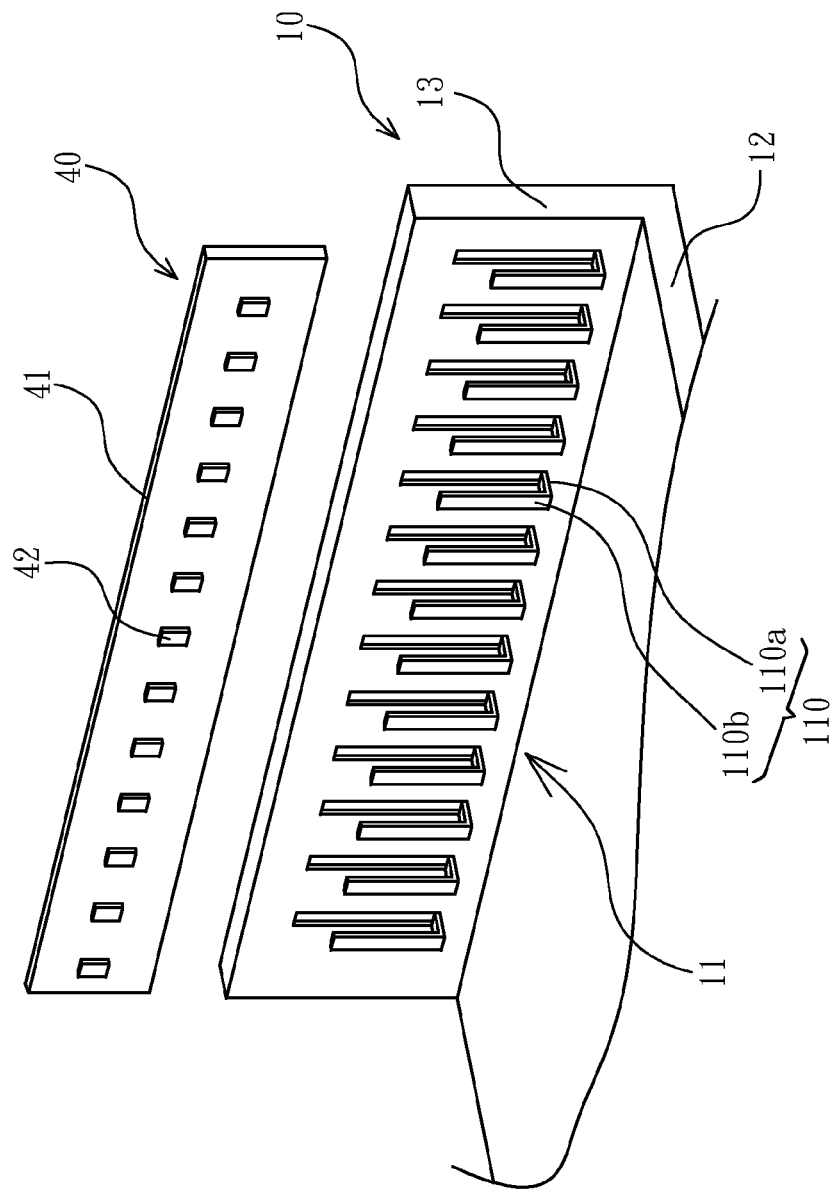
FIG. 3 is a partially exploded perspective view of the rack of the backlight module and the light bar according to a first embodiment of the present invention.

With reference to FIGS. 2 and 3, FIG. 3 discloses a partially exploded perspective view of the rack 10 and the at least one light bar 40. In this embodiment, the rack 10 is a back board of the backlight module, and the rack 10 is made of aluminum, copper, iron or other metal material. In the embodiment, the rack 10 has a horizontal portion 12 and at least one perpendicular portion 13. The at least one perpendicular portion 13 is extended upward from at least one side edge of the horizontal portion 12. The at least one light-bar fixing structure 11 is mounted on a sidewall of the rack 10. In details, the sidewall is an inner surface of the at least one perpendicular portion 13, and the at least one light-bar fixing structure 11 may be integrally formed on the inner surface of the at least one perpendicular portion 13. With reference to FIG. 3, the at least one light-bar fixing structure 11 is constructed by a plurality of clamping arms 110, and each of the clamping arms 110 may be L-shaped and have a shorter portion 110a and a longer portion 110b, wherein an end of the shorter portion 110a is transversely mounted on the sidewall (i.e. the inner surface of the at least one perpendicular portion 13); and the longer portion 110b is protruded longitudinally from the other end of the shorter portion 110a. In the embodiment, the longer portion 110b is parallel to the at least one perpendicular portion 13. In the embodiment, the clamping arms 110 is preferably formed by punching the perpendicular portion 13 or directly formed by aluminum extrusion, but not limited thereto. With reference to FIG. 3, when the clamping arms 110 is formed by punching, the rack 10 further has a plurality of through holes that are formed on the sidewall of the rack 10 and respectively corresponding to the clamping arms 110.

With reference to FIG. 2, the light guide plate 20 is mounted on the rack 10, in this embodiment, the light guide plate 20 is mounted on the horizontal portion 12 of the rack 10, and a side edge of the light guide plate 20 is abutted against the longer portions 110b of the clamping arms 110. The optical film 30 is mounted on the light guide plate 20.

With reference to FIGS. 2 and 3, the light bar 40 is fixed on the inner surface of the perpendicular portion 13 of the rack 10, clamped and positioned by the clamping arms 110 of the light-bar fixing structure 11. In details, the light bar 40 has a circuit board 41 and a plurality of light emitting device 42. A longer edge of the circuit board 41 is abutted against on the shorter portions 110a of the clamping arms 110, and the circuit board 41 is clamped by the inner surface of the perpendicular portion 13 and the longer portions 110b of the clamping arms 110. With reference to FIG. 3, the circuit board 41 may cover the through holes formed on the sidewalls of the rack 10. The light emitting devices 42 are arranged at intervals and mounted on the circuit board 41, wherein each of the light emitting devices 42 lies between two adjacent clamping arms 110, and the emitting direction thereof faces the light guide plate 20. The light emitting devices 42 are preferably light emitting diodes (LED).

Because the present invention uses the clamping arms 110 to achieve the object of stably fixing the light bar 40 on the rack 10, without using fastening through screws or thermally conductive adhesive tapes, mounting or dismounting are both convenient. Once the light bar 40 is damaged and needs to be changed, other components of the backlight module do not need to be dismounted in advance during the dismounting process of the light bar 40. Therefore the other components of the backlight module (such as the light guide plate 20 and the optical film 30) will not easily be affected or polluted.

Furthermore, since a side edge of the light guide plate 20 is able to be tightly abutted against the longer portions 110b of the clamping portions 110, the light-bar fixing structure 11 further has an advantage of stabilizing the light guide plate 20.

Figure 4:
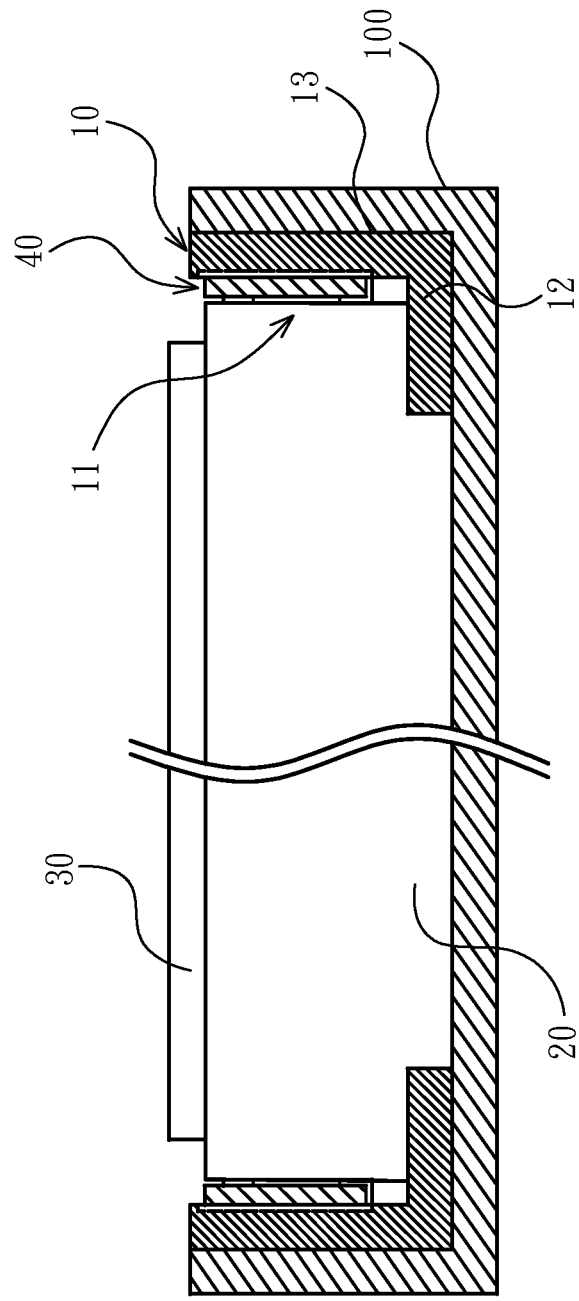
FIG. 4 is a cross-sectional side view of a backlight module and a light-bar fixing structure thereof according to a second embodiment of the present invention.

With reference to FIG. 4, a backlight module and a light-bar fixing structure thereof according to a second embodiment of the present invention is similar to the first embodiment of the present invention, so as to use similar terms and numerals of the first embodiment. But, the differences of the second embodiment is characterized in that the rack 10 of the second embodiment is an L-shaped light bar bracket which is adequately attached to a back board 100 of the backlight module. The rack 10 and the back board 100 are all made of aluminum, copper, iron or other metal material, and the clamping arms 110 of the rack 10 are preferably formed by punching to process the perpendicular portion 13 or directly formed by aluminum extrusion, but not limited thereto. In the second embodiment, the clamping arms 110 of the rack 10 are the same as the clamping arms 110 in the first embodiment and have the same advantages of mounting the light bar 40 easily and stabilizing the light guide plate 20.

In conclusion, comparing with conventional backlight module, although fastening through screw or thermally conductive adhesive tapes can stably fix a light on a rack, such fixing methods make dismounting difficult, and may lead to causing damage to other components of the backlight module when the light bar is damaged and needs to be changed. The backlight module of the present invention in FIG. 3 is formed with a plurality of said clamping arms 110 on the sidewall of the rack 10 to construct the light-bar fixing structure 11, and the clamping arms 110 indeed efficiently and conveniently fix the light bar 40 and are also convenient for dismounting the light bar 40, and further enhance efficiency of assembling backlight modules and convenience of maintenance.

The present invention has been described with a preferred embodiment thereof and it is understood that many changes and modifications to the described embodiment can be carried out without departing from the scope and the spirit of the invention that is intended to be limited only by the appended claims.

The invention claimed is:

1. A light-bar fixing structure of a backlight module, characterized in that: the light-bar fixing structure is mounted on a sidewall of a rack of the backlight module and comprises a plurality of clamping arms arranged side by side as a row of teeth to stably clamp and position a light bar of the backlight module; wherein each of the clamping arms is L-shaped and has a shorter portion and a longer portion, wherein an end of the shorter portion is vertically mounted on the sidewall, and the longer portion is protruded longitudinally from the other end of the shorter portion and is parallel to the sidewall; the light bar has a circuit board and a plurality of light emitting devices, wherein the circuit board has a longer edge abutted against the shorter portions of the clamping arms, and the circuit board is clamped by the sidewall and the longer portions of the clamping arms; a plurality of through holes are formed on the sidewall and face a back of the circuit board; the light emitting devices are arranged at intervals and mounted on the circuit board, wherein each of the light emitting devices is disposed between two of the adjacent clamping arms.

2. A light-bar fixing structure of a backlight module, characterized in that: the light-bar fixing structure is mounted on a sidewall of a rack of the backlight module and has a plurality of clamping arms, which are arranged side by side as a row of teeth for stably clamping and positioning a light bar of the backlight module; each of the clamping arms is L-shaped and has a shorter portion and a longer portion, wherein an end of the shorter portion is vertically mounted on the sidewall, and the longer portion is protruded longitudinally from the other end of the shorter portion; the light bar has a circuit board and a plurality of light emitting devices, wherein the circuit board has a longer edge abutted against the shorter portions of the clamping arms, and the circuit board is clamped by the sidewall and the longer portions of the clamping arms; a plurality of through holes are formed on the sidewall and face a back of the circuit board; the light emitting devices are arranged at intervals and mounted on the circuit board, wherein each of the light emitting devices is disposed between two adjacent clamping arms.

3. The light-bar fixing structure of a backlight module as claimed in claim 2, characterized in that: the rack is a light bar bracket or a back board of a backlight module.

4. The light-bar fixing structure of a backlight module as claimed in claim 2, characterized in that: the rack has at least one perpendicular portion; the sidewall is an inner surface of the at least one perpendicular portion.

5. The light-bar fixing structure of a backlight module as claimed in claim 4, characterized in that: the rack further has a horizontal portion, and the at least one perpendicular portion is extended upward from at least one side edge of the horizontal portion.

6. A backlight module, characterized in that: the backlight module comprises:
   a rack; having a sidewall and a plurality of through holes formed on the sidewall;
   at least one light bar mounted on the sidewall of the rack and having a circuit board, wherein the through holes on the sidewall face a back of the circuit board;
   at least one light-bar fixing structure mounted on the sidewall of the rack, wherein the light-bar fixing structure has a plurality of clamping arms arranged side by side as a row of teeth to clamp and fix the light bar; each of the clamping arms is L-shaped and has a shorter portion and a longer portion, wherein an end of the shorter portion is vertically mounted on the sidewall, and the longer portion is protruded longitudinally from the other end of the shorter portion; and
   a light guide plate, wherein a side edge of the light guide plate is abutted against the longer portions of the clamping arms.

7. The backlight module as claimed in claim 6, characterized in that: the rack is a back board or a light bar bracket.

8. The backlight module as claimed in claim 6, characterized in that: the longer portion is parallel to the sidewall.

9. The backlight module as claimed in claim 6, characterized in that: the light bar further has a plurality of light emitting devices, wherein the circuit board has a longer edge abutted against the shorter portions of the clamping arms, and the circuit board is clamped by the sidewall and the longer portions of the clamping arms; the light emitting devices are arranged at intervals and mounted on the circuit board, wherein each of the light emitting devices lies between two adjacent clamping arms.

\* \* \* \* \*